United States Patent [19]
Aratani

[11] Patent Number: 5,112,377
[45] Date of Patent: May 12, 1992

[54] METHOD OF TOUGHENING GLASS SHEET BY QUENCHING

[75] Inventor: Shin-ichi Aratani, Mie, Japan

[73] Assignee: Central Glass Company, Limited, Ube, Japan

[21] Appl. No.: 668,015

[22] Filed: Mar. 12, 1991

[30] Foreign Application Priority Data

Mar. 19, 1990 [JP] Japan .................................. 2-68762

[51] Int. Cl.⁵ .............................................. C08B 27/04
[52] U.S. Cl. ........................................ 65/114; 65/104
[58] Field of Search .................. 65/114, 104, 348, 349

[56] References Cited

U.S. PATENT DOCUMENTS

| | | | |
|---|---|---|---|
| 4,735,646 | 4/1988 | Aratani et al. | 65/114 |
| 4,773,926 | 9/1988 | Letemps et al. | 65/114 |
| 4,888,038 | 12/1989 | Herrington et al. | 65/114 |
| 4,913,720 | 4/1990 | Gardon | 65/114 |

*Primary Examiner*—Joye L. Woodard
*Attorney, Agent, or Firm*—Fleit, Jacobson, Cohn, Price, Holman & Stern

[57] ABSTRACT

This invention relates to a method of toughening a glass sheet by heating it to a temperature above the strain point and quenching the heated glass sheet with blasts of air. The heated glass sheet is positioned between two oppositely arranged blastheads, each of which has a plurality of first nozzles and a plurality of second nozzles. The first nozzles are connected to a supply of compressed air, and the compressed air is forced to rapidly expand so as to produce a shock wave and have a first predetermined pressure at the exit of each of the first nozzles. Simultaneously, cooling air is supplied from a blower to the second nozzles so as to have a second predetermined pressure, which is higher than the first predetermined pressure, at the exit of each of the second nozzles. The difference between the second and first predetermined pressures is not more than 0.05 kg/cm². By this method, even glass sheets thinner than 3 mm can be toughened so as to meet regulations for toughened glass sheets to be used in automobile windows without suffering from swaying under quenching and resultant deformation or distortion of the glass sheet.

9 Claims, 1 Drawing Sheet

METHOD OF TOUGHENING GLASS SHEET BY QUENCHING

BACKGROUND OF THE INVENTION

This invention relates to a method of toughening a glass sheet by heating the glass sheet to a temperature above the strain point and quenching the heated glass sheet with blasts of cool air. The method is particularly suitable for use in toughening a relatively thin glass sheet, viz. A glass sheet about 1.5–3.0 mm in thickness, which may be a curved glass sheet for use as an automobile window glass.

As recent automobiles are designed to reduce the gross weight, there is a growing demand for toughening of relatively thin glass sheets for use in automobile side and rear windows. To ensure an adequate margin of safety for the drivers and passengers in case of breakage of automobile window glass, there are official regulations which specify fracture requirements of toughened glass sheets. Typical regulations require that the number of glass fragments contained in any 5 cm ×5 cm square traced on the glass sheet (excluding a circular area with a radius of 7.5 cm around the point of impact and marginal areas 3 cm in breadth) should fall in the range from 60 to 400, that the fragments should not be larger than 3 cm$^2$ in surface area and that the fragments should not include elongated particles longer than 75 mm (such elongated particles are called "splines").

However, it is not easy to toughen glass sheets thinner than about 3 mm by a conventional air quenching method so as to fully meet the official regulations. In general, the quenching is for producing a center-to-surface gradient of temperature through the thickness of the glass sheet and results in permanent compressive stresses being produced in the surface layers of the glass sheet with compensating tensile stresses in the center of the glass thickness. In the case of a thin glass sheet, it is difficult to create and maintain a suitable gradient of temperature in the glass sheet during the quenching process. The difficulty is augmented when the thin glass sheet is an intricately curved glass sheet.

For toughening relatively thin glass sheets by air quenching, there are some proposals with a view to enhancing cooling efficiency. For example U.S. Pat. No. 4,578,102 proposes directing jets of a mixture of air and atomized water onto the heated glass surfaces by means of Laval nozzles. Air is supplied to the Lavel nozzles at such a pressure that the jet velocity at the exit of each nozzle becomes at least sonic, while water is introduced from a radial direction into the constricted throat section of each nozzle. The mixture of air and atomized water has a higher specific heat than air, and it is intended to rapidly extract heat from the glass sheet surfaces by using two-phase jets high in both velocity and specific heat. However, from a practical point of view, the use of water besides air offers complicacy, and very high precision equipment is required for complete atomization of water and thorough mixing of atomized water with air during the passage of the two fluids from the nozzle throat to the nozzle exit. Additionally, there is a possibility that droplets of water will hit the heated glass sheet to cause breakage of the glass sheet.

JP-A 60-145921 relates to quenching of a heated glass sheet with air jets and proposes to determine the air pressure and the nozzle configuration such that the maximum drop of the cooling air pressure takes place at the exit of each nozzle and the air jet velocity at the nozzle exit becomes sonic. It is a disadvantage of this method that fluctuations of the air supply pressure in the quenching equipment are liable to be transmitted to the glass sheet surfaces so that the glass sheet under quenching, is liable to be distorted in when the glass sheet is relatively thin. Besides, in this method it will be necessary to give very careful consideration to the arrangement of the quenching nozzles.

U.S. Pat. No. 4,735,646 relates to quenching of a heated glass sheet and proposes to produce a shock wave in the air chamber, in each of two opposite blast heads from which nozzles protrude, by forcing compressed air to rapidly expand in each air chamber such that the pressure (gauge pressure) of air rapidly drops from a predetermined first pressure ranging from 2 to 8 kg/cm$^2$ to a predetermined second pressure ranging from 0.05 to 0.5 kg/cm$^2$. By virtue of the propagation of the shock wave through the air chamber and the nozzles, the air jets have high kinetic energy at the moment of impingement on the glass surfaces and hence are high in the initial cooling effect. By this method, even glass sheets thinner than 3 mm can be toughened so as to meet the regulations for toughened glass sheets for use in automobile windows. However, this method requires an air quenching apparatus of relatively large capacity. JP-A 64-3029 relates to toughening of a glass sheet by using the method of U.S. Pat. No. 4,735,646 and proposes to first quench a central region of the heated glass sheet and then gradually direct the quenching air jets toward the edges of the glass sheet. This proposal is for relatively mildly tempering glass sheets about 3–5 mm in thickness and is not suitable for sufficiently toughening thin glass sheets for use in automobile windows.

There is another problem relating to the toughening of a thin glass sheet in that it is intricately curved. During quenching of the heated glass sheet in a suspended state, the glass sheet is liable to sway under the action of blasts of cooling air. The swaying of the hot glass sheet is unfavorable for accurate toughening of the glass sheet and, further, is liable to cause some deformation of the glass sheet, or breaking, in an extreme case, or mechanical or optical distortion of the toughened glass sheet.

SUMMARY OF THE INVENTION

It is an object of the present invention to provide an improved method for toughening a flat or curved glass sheet, which may be thinner than about 3 mm and may be used as an automobile window glass, by heating the glass sheet and then quenching the heated glass sheet with jets of air, This method is favorable for industrial practice and is capable of toughening the glass sheet so as to fully meet official regulations for toughened glass sheets to be used in automobile windows without deforming the glass sheet under quenching.

The present invention provides a method of toughening a glass sheet, the method including the steps of heating the glass sheet to a temperature above the strain point of the glass and positioning the heated glass sheet between two oppositely arranged blastheads such that the two opposite surfaces of the glass sheet face the two blastheads, respectively. According to the invention, each of the two blastheads is provided with a plurality of first nozzles, to which air for quenching the heated glass sheet can be supplied from a compressor and a plurality of second nozzles, to which air can be supplied from a blower. The heated glass plate is quenched by blowing first cooling air from the first nozzles of each blasthead onto the heated glass sheet and simultaneously blowing second cooling air from the second nozzles of each blasthead onto the heated glass sheet. The first cooling air is supplied from the compressor and forced to rapidly expand so as to produce a shock wave and have a first predetermined pressure at the exit of each of the first nozzles, and the second cooling air is supplied from the blower so as to have a second predetermined pressure at the exit of each of the second nozzles. It is necessary that the second predetermined pressure be higher than the first predetermined pressure and that the difference between the second pressure and the first pressure be not greater than 500 mmH$_2$O (0.05 kg/cm$^2$).

Thus, the present invention accomplishes the above stated object by combining the shock wave quenching method disclosed in U.S. Pat. No. 4,735,646 and a conventional quenching method using a blower as the supply of cooling air.

In the method according to the invention, the "first" cooling air which is producing a shock wave, impinges on the heated glass sheet surfaces with relatively high kinetic energy and hence serves the purpose of breaking up a heat transfer suppressive laminar layer that exists on each surface of the heated glass sheet, or greatly reducing the thickness of that layer, thereby rapidly and efficiently dissipating or extracting heat from the glass surfaces. Rapid extraction of heat from the heated glass sheet means efficient cooling of the heated glass sheet at an initial stage of the quenching process: this is very favorable for toughening of the glass sheet. However, when it is intended to accomplish quenching of the heated glass sheet solely by the cooling air, the blastheads and the related components for supplying compressed air and producing a shock wave must be made very large in capacity, and, besides, it is almost inevitable that the glass sheet under quenching will sway due to pulsation of the cooling air. Since the heated glass sheet is in a viscoelastic state, the swaying is liable to cause deformation of the glass sheet.

In the present invention, the "second" cooling air supplied from a blower is used together with the "first" cooling air so as to take over a considerable portion of the quenching work, and the pressure of the second cooling air at the exit of each nozzle is made higher than the pressure of the first cooling air at the exit of each nozzle on condition that the difference between the two pressures is not greater than 500 mm H$_2$O (0.05 kg/cm$^2$). By this measure, swaying of the glass sheet under quenching is prevented almost completely without sacrificing the quenching effect. Even though the quantity of the cooling air producing a shock wave is reduced, it is still possible to produce a suitable center-to-surface gradient of temperature in the glass sheet at an initial stage of quenching. Also, it is possible to maintain a thicknesswise temperature gradient in the glass sheet and suppress relieving of the compressive stresses created in the surface layers of the glass sheet until completion of quenching.

Glass sheets of various thicknesses can be well toughened by the method according to the invention, and this method is particularly suitable for toughening a thin glass sheet ranging from about 3.0 mm to about 1.5 mm in thickness. This method is applicable to both flat glass sheets and curved glass sheets, including thin and intricately curved glass sheets. By this method, it is possible to toughen flat or curved glass sheets thinner than 3 mm so as to fully meet official regulations for toughened glass sheets to be used in automobile windows. Furthermore, this method is applicable to the manufacture of toughened glass sheets for variously different uses, such as railroad vehicle window glasses, building window panes, furniture glasses and electronic device substrates. In putting this invention into industrial practice, it is not necessary to use a quenching apparatus of very large capacity.

When the method according to the invention is used, deformation or distortion of the quenched glass sheet is rare, and the probability of breakage of the quenched glass sheet greatly reduces, because the quenching can be accomplished with little swaying of the glass sheet undergoing quenching. This is particularly valuable in the case of toughening a thin glass sheet since, in general, liability of glass sheet to deformation or distortion is augmented in a manner approximately inversely proportional to the square of thickness.

DESCRIPTION OF THE PREFERRED EMBODIMENTS

In toughening a glass sheet by a method according to the invention, the first step is uniformly heating the glass sheet to a temperature above the strain point of the glass and below the softening temperature, e.g., to 600°–700° C. This is similar to the heating in the conventional quench toughening methods.

Figure 1:
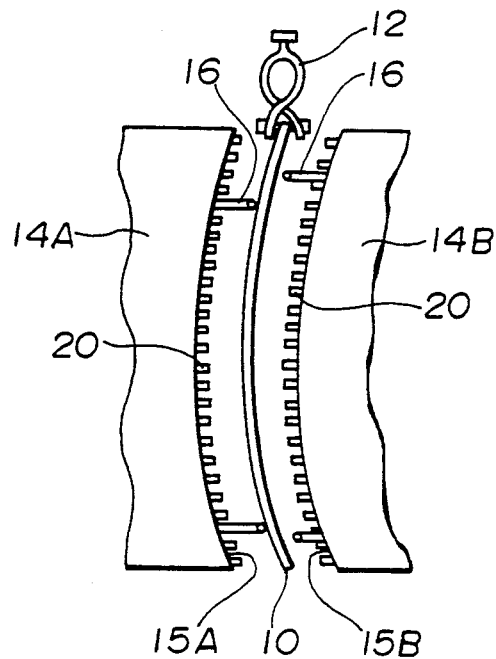
FIG. 1 is a side elevational view of a pair of blastheads used for toughening a curved glass sheet by a method according to the invention.

In FIG. 1, numeral 10 indicates a heated glass sheet to be quenched. In this example, the glass sheet 10 is a curved glass sheet. The glass sheet 10 is suspended by tongs 12 which is coupled with a hoist means (not shown) and positioned between two oppositely arranged blastheads 14A and 14B. For quenching the curved glass sheet 10, the front surface 15A of the blasthead 14A is a concave surface, whereas the front surface 15B of the opposite blasthead 14B is a convex surface. A number of nozzles 20 protrude from the front surface 15A, 15B of each blasthead 14A, 14B toward the glass sheet 10. Actually, as will be described hereinafter, the nozzles 20 of each blasthead 14A, 14B are divided into two groups which are indicated in FIG. 1. To suppress swaying of the glass sheet 10 during the quenching process, each blasthead 14A, 14B has stabilizing jigs 16 which make contact with the glass sheet 10 in its edge regions.

Figure 2:
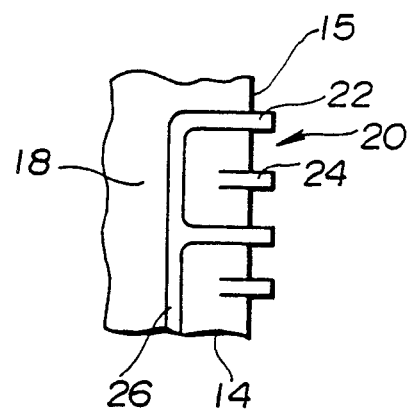
FIG. 2 is a schematically sectional illustration of an arrangement of two groups of quenching nozzles provided to a blasthead for use in this invention.

FIG. 2 shows a blasthead 14 which corresponds to either of the two blastheads 14A, 14B in FIG. 1 but is assumed to have a flat front surface 15. As shown in FIG. 2, the nozzles 20 in FIG. 1 consist of a number of first nozzles 22 and a number of second nozzles 24. The first nozzles 22 and the second nozzles 24 are generally alternately distributed over the front surface 15 of the blasthead 14. The first nozzles 22 can communicate with a compressor (not shown) provided with an air tank through a channel 26 in the blasthead 14, whereas the second nozzles 24 can communcate with a blower (not shown) through an air chamber 18 in the blasthead 14. More particularly, there is another chamber (not shown) between the channel 26 and the compressor, and the communication of that chamber with the compressor is controlled by a suitable valve means. There is a pressure control means for controlling the pressure of the compressed air. The first nozzles 22 are arranged in a suitably designed pattern, such as a staggered lattice-like pattern, and the second nozzles 24 are also arranged in a suitably designed pattern.

In preparation for the quenching operation, the compressor is operated so as to accumulate compressed air having a predetermined pressure 2-8 kg/cm² (gauge pressure) in the air tank while the communication of the chamber upstream of the channel 26 with the compressor is blocked. At the start of the quenching operation, the valve means is opened to allow the compressed air to rush into and expand in the chamber upstream of the channel 26. Naturally, the compressed air undergoes a considerable reduction in pressure, while the atmospheric air in the expansion chamber, channel 26 and the first nozzles 22 is rapidly compressed. Consequently, a shock wave is produced in the expansion chamber, and the shock wave propagates through the channel 26 and the first nozzles 22. The expansion chamber, channel 26 and the nozzles 22 are designed such that at the exit of each of the first nozzles 22, the air jetting from the nozzle 22 has a predetermined pressure, $P_C$, which is in the range from 1000 to 4000 mmH$_2$O (0.1 to 0.4 kg/cm²), and preferably in the range from 2000 to 3500 mmH$_2$O (0.2 to 0.35 kg/cm²). Simultaneously, air is supplied to the second nozzles 14 from the blower such that at the exit of each of the second nozzles 24 the air jetting from the nozzle 24 has a predetermined pressure, $P_B$, which is higher than the pressure $P_C$. The heated glass sheet 10 is rapidly cooled by the jets of air from the first and second nozzles 22 and 24 of the two blastheads.

The pressure $P_C$ and the pressure $P_B$ are determined so as to satisfy the inequality $0 < (P_B - P_C) \leq 500$ mmH$_2$O (0.05 kg/cm²). If $P_C$ is higher than $P_B$, it is difficult to prevent swaying of the hot glass sheet under quenching and consequential deforming or mechanical or optical distortion of the glass sheet. Even though the stabilizing jigs 16 are used the hot glass sheet, in a viscoelastic state, tends to sway under the action of the blasts of cooling air once the glass sheet begins to sway, there is a possibility that the stabilizing jigs 16 themselves will become a cause of flawing of the glass sheet. On the other hand, if the difference $(P_B - P_C)$ is greater than 500 mmH$_2$O (0.05 kg/cm²), it is difficult to satisfactorily toughen the glass sheet, because the effect of using the cooling air jets producing a shock wave is insufficient. It is preferable that the difference $(P_B - P_C)$ be not smaller than 50 mmH$_2$O (0.005 kg/cm²). In the case of toughening a curved glass sheet it is preferable that $P_B$ and $P_C$, at the nozzle exits on the blasthead (14B) having a convex front surface, are higher than $P_B$ and $P_C$ on the opposite blasthead (14A) having a concave front surface by 50-200 mmH$_2$O (0.005-0.02 kg/cm²), respectively.

Figure 3:
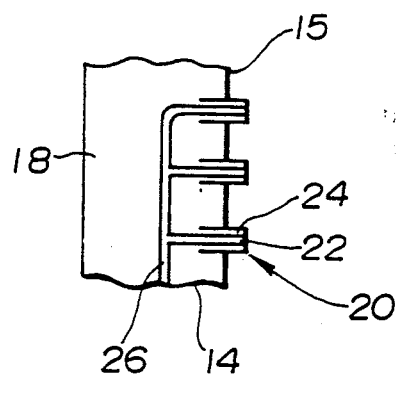
FIG. 3 is a schematically sectional illustration of another arrangement of two groups of quenching nozzles provided to a blasthead for use in this invention.

Referring to FIG. 3, as an alternative to the separate arrangement of the first and second nozzles 22 and 24 as shown in FIG. 2, it is possible to coaxially combine each of the first nozzles 22 with one of the second nozzles 24 so as to constitute a double nozzle 20. In the double nozzle, it is rather favorable to have the first nozzle 22 extend through the second nozzle 24 for both efficiency of quenching and stability of the glass sheet under quenching, although it is also permissible to extend the second nozzle 24 through the first nozzle 22. Irrespective of the arrangement of the first nozzles 22 and the second nozzles 24, it is suitable to have the distance of the nozzles 22, 24 on each blasthead from the glass sheet surface be from about 5 to 30 mm.

In performing a quenching operation according to the invention, the heated glass sheet is not necessarily held in a vertical posture. If desired, the heated glass sheet may be held in a horizontal posture.

EXAMPLES 1-5

In every example, a curved glass sheet was heated and quenched by a method according to the invention using two blastheads in the manner shown in FIG. 1. On each of the two blasthead, the first nozzles 22 and the second nozzles 24 were arranged separately and generally alternately as illustrated in FIG. 2. In each example, the dimensions of the glass sheet were as shown in Table 1, and the glass sheet was heated to a temperature in the range of 650° to 700° C. The primary pressure of compressed air for the first nozzles 22 was 6.8 kg/cm² (gauge pressure) in Examples 1, 2 and 4 and 7.0 kg/cm² in Examples 3 and 5. The pressure of cooling air at the exit of each of the first nozzles 22, $P_C$, and the pressure of cooling air at the exit of each of the second nozzles 24, $P_B$, were varied as shown in Table 1. The glass sheets toughened in Examples 1-5 were subjected to a fragmentation test as described hereinafter.

COMPARATIVE EXAMPLES 1-4

As shown in Table 1, the quenching conditions in Examples 1-5 were variously modified. In Comparative Example 1, cooling air was supplied from a blower to every nozzle on each blasthead. In Comparative Examples 2 and 4, the air pressure $P_B$ was made lower than the air pressure $P_C$, and in Comparative Example 3, the pressure difference $(P_B - P_C)$ was made greater than 500 mmH$_2$O (0.05 kg/cm²). The toughened glass sheets were subjected to a fragmentation test.

FRAGMENTATION TEST

The test procedure was generally in accordance with EEC standard ECE R43. The fragmentation was checked by counting the number of glass particles included in each of many arbitrarily traced 50 mm × 50 mm square areas of the tested glass sheet and the total number of elongated particles (splines) which were longer than 75 mm and in which the length-to-width ratio was greater than 4. However, fragmentation was not checked in a belt-like area 20 mm wide along the edges of the glass sheet and within a radius of 75 mm around the point of impact. The test results were as shown in Table 2. In the column of Particle Count, "OK" means that the number of glass particles in any of the aforementioned 50 mm square areas was in the range of 60 to 400, and "NG" means that the number of glass particles was less than 60 or more than 400 in at least one of the square areas.

PRECISION OF CURVATURE

Prior to the fragmentation test, the glass sheets (curved glass sheets) toughened in the Examples and Comparative Examples were subjected to measurement of curvature on the convex surface. In Table 2, "OK" means that local deviations of the curved surface from the prescribed value were within ±1.5 mm and that distortion of reflected images was slight and tolerable, and "NG" means the occurrence of greater deviations of the curved surface or intolerable distortion of reflected images.

TABLE 1

| Glass Sheet (w × l × t, mm) | $P_B$ mm $H_2O$ (kg/cm$^2$) | $P_C$ mm $H_2O$ (kg/cm$^2$) | $P_B - P_C$ mm $H_2O$ (kg/cm$^2$) |
|---|---|---|---|
| Example 1 | 700 × 500 × 2.8 | 2700 (0.27) | 2300 (0.23) | 400 (0.04) |
| Example 2 | " | 2600 (0.26) | 2200 (0.22) | 400 (0.04) |
| Example 3 | " | 2500 (0.25) | 2200 (0.22) | 300 (0.03) |
| Example 4 | 650 × 500 × 2.5 | 2750 (0.275) | 2700 (0.27) | 50 (0.005) |
| Example 5 | " | 2800 (0.28) | 2700 (0.27) | 100 (0.01) |
| Comp. Ex. 1 | 700 × 500 × 2.8 | 2500 (0.25) | — | — |
| Comp. Ex. 2 | " | 2100 (0.21) | 2200 (0.22) | −100 (−0.01) |
| Comp. Ex. 3 | 650 × 500 × 2.5 | 1800 (0.18) | 1200 (0.12) | 600 (0.06) |
| Comp. Ex. 4 | " | 2400 (0.24) | 3000 (0.30) | −600 (−0.06) |

TABLE 2

| | Toughened Glass Sheet Fragmentation Test Results | | Precision of Glass Sheet Curvature |
|---|---|---|---|
| | Particle Count | Number of Splines | |
| Example 1 | OK | 0 | OK |
| Example 2 | OK | 0 | OK |
| Example 3 | OK | 0 | OK |
| Example 4 | OK | 0 | OK |
| Example 5 | OK | 0 | OK |
| Comp. Ex. 1 | NG | 7 | OK |
| Comp. Ex. 2 | NG | 3 | NG |
| Comp. Ex. 3 | NG | 3 | OK |
| Comp. Ex. 4 | OK | 0 | NG |

What is claimed is:

1. A method of toughening a glass sheet, comprising the steps of:
   (a) heating the glass sheet to a temperature above the strain point of the glass;
   (b) positioning the heated glass sheet between two oppositely arranged blastheads such that the two opposite surfaces of the glass sheet face the two blastheads, respectively, each of the two blastheads being provided with a plurality of first nozzles to which air for quenching the heated glass sheet can be supplied from a compressor and a plurality of second nozzles to which air can be supplied from a blower; and
   (c) blowing first cooling air from said first nozzles of each of the two blasthead onto the heated glass sheet and simultaneously blowing second cooling air from said second nozzles of each of the two blasteads onto the heated glass sheet, said first cooling air being supplied from said compressor and forced to rapidly expand so as to produce a shock wave and have a first predetermined pressure at the exit of each of said first nozzles, said second cooling air being supplied from said blower so as to have a second predetermined pressure at the exit of each of said second nozzles, said second predetermined pressure being higher than said first predetermined pressure with the proviso that the difference between said second predetermined pressure and said first predetermined pressure being not greater than 0.05 kg/cm$^2$.

2. A method according to claim 1, wherein said first predetermined pressure is in the range from 0.1 to 0.4 kg/cm$^2$.

3. A method according to claim 2, wherein said first predetermined pressure is in the range from 0.2 to 0.35 kg/cm$^2$.

4. A method according to claim 1, wherein said first cooling air is provided by forcing compressed air having a pressure in the range from 2 to 8 kg/cm$^2$ to rapidly expand in a channel which includes said first nozzles.

5. A method according to claim 1, wherein each of said first nozzles is arranged coaxially with one of said second nozzles.

6. A method according to claim 5, wherein each of said first nozzles extends through one of said second nozzles.

7. A method according to claim 1, wherein said first nozzles and said second nozzles are generally alternately distributed over a front surface of each of the two blastheads.

8. A method according to claim 1, wherein the glass sheet has a thickness in the range from 3.0 mm to 1.5 mm.

9. A method according to claim 8, wherein the glass sheet is a curved glass sheet.

* * * * *